United States Patent
Fohl et al.

[11] Patent Number: 5,857,770
[45] Date of Patent: Jan. 12, 1999

[54] LASER ILLUMINATED VEHICLE LIGHTING SYSTEM UTILIZING A TURNING PRISM

[75] Inventors: Timothy Fohl, Carlisle, Mass.; Michael Anthony Marinelli, Northville, Mich.; David Allen O'Neil, Radnor, Pa.; Jeffrey Thomas Remillard, Ypsilanti, Mich.

[73] Assignee: Ford Motor Company, Dearborn, Mich.

[21] Appl. No.: 822,023

[22] Filed: Mar. 24, 1997

[51] Int. Cl.⁶ .............................. F21V 7/04; F21K 27/00; B60Q 1/00

[52] U.S. Cl. .......................... 362/511; 362/31; 362/259; 362/509; 362/541; 362/551; 362/553

[58] Field of Search .................. 362/61, 32, 259, 362/31, 511, 509, 541, 551, 553

[56] References Cited

U.S. PATENT DOCUMENTS

| | | | |
|---|---|---|---|
| 4,389,698 | 6/1983 | Cibie | 362/32 |
| 4,432,039 | 2/1984 | Cibie | 362/32 |
| 4,954,930 | 9/1990 | Maegawa et al. | 362/32 |
| 5,136,480 | 8/1992 | Pristash et al. | 362/32 |
| 5,295,047 | 3/1994 | Windross | 362/32 |
| 5,349,504 | 9/1994 | Simms et al. | 362/32 |
| 5,365,412 | 11/1994 | Koppolu et al. | 362/32 |
| 5,369,554 | 11/1994 | Erion | 362/32 |
| 5,410,454 | 4/1995 | Murase et al. | |
| 5,422,792 | 6/1995 | Neumann | 362/32 |
| 5,434,754 | 7/1995 | Li et al. | 362/32 |
| 5,436,808 | 7/1995 | Noponen | 362/32 |
| 5,471,371 | 11/1995 | Koppolu et al. | 362/32 |
| 5,515,244 | 5/1996 | Levins et al. | 362/32 |
| 5,581,683 | 12/1996 | Bertignoll et al. | 362/32 |
| 5,700,078 | 12/1997 | Fohl et al. | 362/259 |

FOREIGN PATENT DOCUMENTS

| | | |
|---|---|---|
| 54-162589 | 12/1979 | Japan . |
| 56-102817 A | 8/1981 | Japan . |
| 60-8811 A | 1/1985 | Japan . |

*Primary Examiner*—Sandra O'Shea
*Assistant Examiner*—Matthew J. Spark
*Attorney, Agent, or Firm*—Daniel M. Stock

[57] ABSTRACT

A lighting system for an automotive vehicle includes a remote laser light source coupled with a light transmitting fiber optic light guide which illuminates a thin sheet optical element tail lamp having a manifold portion, a kicker portion adjacent and substantially parallel to the manifold portion, and a turning prism adjacent to and in optical communication with the manifold and kicker portions for receiving light from the manifold portion and internally reflecting and redirecting light to the kicker portion.

1 Claim, 1 Drawing Sheet

LASER ILLUMINATED VEHICLE LIGHTING SYSTEM UTILIZING A TURNING PRISM

FIELD OF THE INVENTION

The present invention relates to a vehicle lighting system, and more specifically, to a laser illuminated, thin sheet optic vehicle lighting system which utilizes a turning prism.

BACKGROUND OF THE INVENTION

Conventional light transmission systems used for vehicle head lights or tail lights typically use a bulb and reflector system. In a bulb and reflector system, the filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting specifications. Typically, in an automotive application, a conventional bulb and reflector system collects and reflects only thirty percent of the light emitted from the bulb filament into the useful lighting area.

Bulb and reflector systems have several disadvantages, including aerodynamics and aesthetic styling. For example, the depth of the reflector along its focal axis and the height of the reflector in directions perpendicular to the focal axis greatly limit attempts at streamlining vehicle contours. Additionally, thermal energy given off by the bulb during operation must be considered. The size of the reflector as well as the material used in its construction vary depending upon the amount of thermal energy generated by the bulb filament. Decreasing the size of the reflector requires use of materials with high thermal resistivity.

One approach to develop an automotive lighting system for use with newer streamlined body designs is proposed in U.S. Pat. No. 5,434,754, assigned to the assignee of the present invention, which discloses the combination of a fiber optic light guide which transmits light from a remote light source, through a light manifold, and to a reflector. One problem with such an approach is the necessity for a manifold. A manifold is required to expand the incoming light for distribution across the lamp surface. This results in a substantial portion of unlit area required for the manifold and hence a larger footprint of the overall lamp. This creates vehicle lighting design inflexibility.

A laser illuminated thin sheet optical element lighting device as disclosed in application Ser. No. 08/780,034 entitled Laser Illuminated Lighting System, assigned to the assignee of the present invention, addressed a number of deficiencies in the vehicle lighting arts. However, the problem of having a large amount of unlit area required for the manifold portion still remains.

Therefore, it would be desirable to provide a laser illuminated, thin sheet optic lighting system for a vehicle which accommodates manufacturing and thermal considerations as well as the space limitations dictated by vehicular aerodynamic and styling requirements.

SUMMARY OF THE INVENTION

Responsive to the deficiencies in the prior art, the present invention provides a thin sheet optical element tail lamp for an automotive vehicle having a manifold portion for receiving light from a light source having light expanding reflective surfaces disposed therein, a kicker portion adjacent and substantially parallel to the manifold portion, the kicker portion having a front surface and reflective surfaces for reflecting light through the front surface disposed therein, and a prism in communication with the manifold and kicker portions for receiving light from the manifold portion and internally reflecting and directing light to the kicker portion.

In a preferred embodiment of the present invention, a vehicle lighting system further includes a remote light source coupled with a light transmitting fiber optic light guide which in combination illuminates the thin sheet optical element tail lamp.

An object of the present invention is to provide a thin sheet optical element tail lamp with a reduced overall footprint.

A feature of the present invention is the utilization of a turning prism. As a result of the turning prism, the manifold portion can be positioned adjacent and substantially parallel to the kicker portion thereby reducing the overall footprint of the thin sheet optical element tail lamp. The reduced footprint allows for greater vehicle design flexibility.

BRIEF DESCRIPTION OF THE DRAWINGS

Other features and advantages of the present invention will become apparent to those skilled in the automotive vehicle lighting arts upon reading the following description with reference to the accompanying drawings, in which.

DETAILED DESCRIPTION OF THE PREFERRED EMBODIMENT

Figure 1:
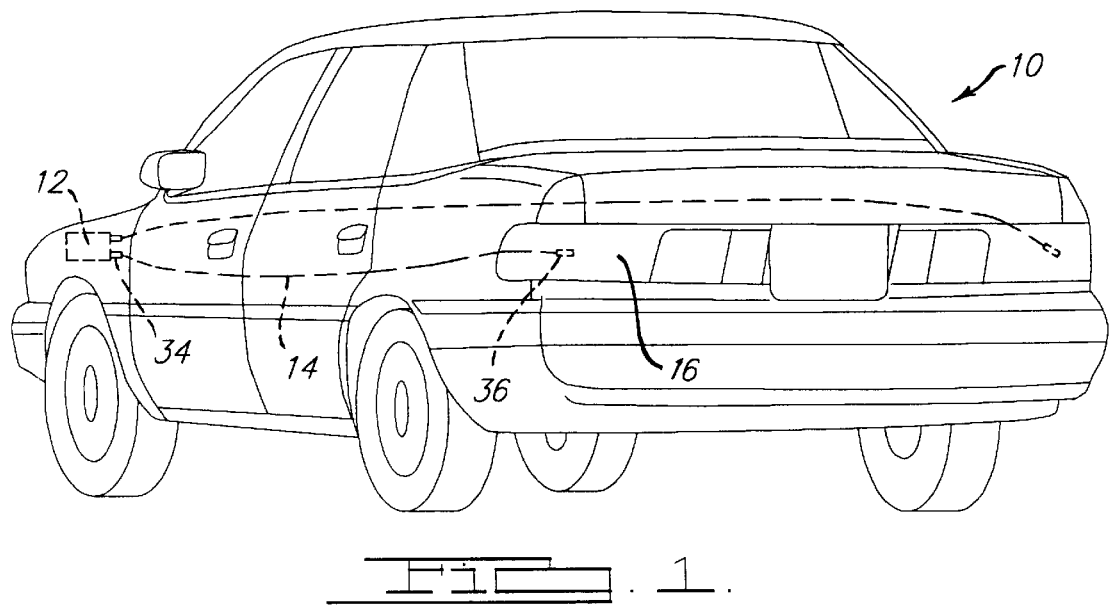
FIG. 1 is a perspective view of an automotive vehicle having a vehicle lighting system.

Turning now to the drawings, and in particular to FIG. 1 thereof, an automotive vehicle 10 is shown having a vehicle lighting system using, in combination, a remote laser light source 12, a fiber optic light guide 14, and a thin sheet optical element tail lamp 16. The thin sheet optical element tail lamp 16 of the present invention may be configured as a head lamp or used for other vehicle lighting applications as those skilled in the vehicle lighting arts will recognize. Hence, the configuration of FIG. 1 is meant only to be illustrative and not limiting.

As illustrated in FIG. 1, preferably a remote laser light source 12 is utilized. The remote laser light source 12 is positioned in the automotive vehicle 10 with consideration given to vehicle design requirements and manufacturing ease relative to the particular lighting objectives. A possible location for the remote laser light source 12 is in the engine compartment (not shown). A single diode laser source is preferably used to provide light for the thin sheet optical element tail lamp 16 of the automotive vehicle 10. It is possible that a laser source can be positioned directly adjacent the thin sheet optical element tail lamp 16. However, as herein described, light is transmitted from a remote laser light source 12 via a fiber optic light guide 14 to the thin sheet optical element tail lamp 16.

Diode lasers offer many advantages over conventional remote lighting sources such as halogen bulbs, light emitting diodes, and arc lamps. Most importantly, the diode laser has a radiance that is many orders of magnitude higher than conventional sources. For example, sources such as halogen lamps and light emitting diodes have brightnesses of 15–200 candelas per square millimeter in contrast to a laser which can typically have a brightness of 200,000 $cd/mm^2$. Additionally, lasers are more efficient at converting power into light of the desired wavelength. For example, in an incandescent lamp approximately 1.5% of the input power is converted into red light. Typical laser diodes emitting in the 635–670 nm band range have conversion efficiencies of approximately 15%. Also, because the laser diode does not rely on high temperatures to generate light, it may have a lifetime significantly longer than that of incandescent sources.

Preferably a fiber optic light guide 14 is utilized to transmit light from the remote laser light source 12, as shown in FIG. 1. The fiber optic light guide 14 has a first end 34 and a second end 36. Because of the high brightness (candela per unit area) of the laser, small diameter (0.1–1.0 mm) glass fibers are preferably used to transmit the light.

The use of small diameter glass fibers provides several benefits over the monofilament plastic pipes and glass fiber bundles used in non-laser based remote lighting systems. Small diameter glass fibers are less bulky than plastic pipes or glass fiber bundles which typically are 10–12 mm in diameter. Also, small diameter glass fibers are significantly cheaper than monofilament plastic pipe or glass fiber bundles. Plastic light pipes have the tendency to deteriorate and "yellow" when exposed to the environmental heat and the heat from the high intensity light of conventional remote light sources. Additionally, small glass fibers are easier to package, handle, and install than plastic pipes or glass fiber bundles and they weigh less. Finally, the directional nature of the laser and small area of the emitting aperture (approximately 1×250 $\mu m^2$) results in a coupling efficiency of greater than 85% into a 1 mm diameter fiber. Such an efficiency is difficult to achieve with conventional light sources using plastic pipe or glass fiber bundles.

The thin sheet optical element tail lamp 16 is generally planar and rectangular and preferably made of a polymeric sheet ranging in thickness from 10 $\mu m$–6 mm. A curved profile may be used for the thin sheet optical element tail lamp 16 depending on particular design requirements. The thin sheet optical element tail lamp 16 is preferably made from a transparent, solid piece of plastic such as polycarbonate and utilizes the principle of total internal reflection (TIR) to reflect light. TIR is explained in more detail below. Other transparent materials such as acrylics may also be used.

Figure 2:
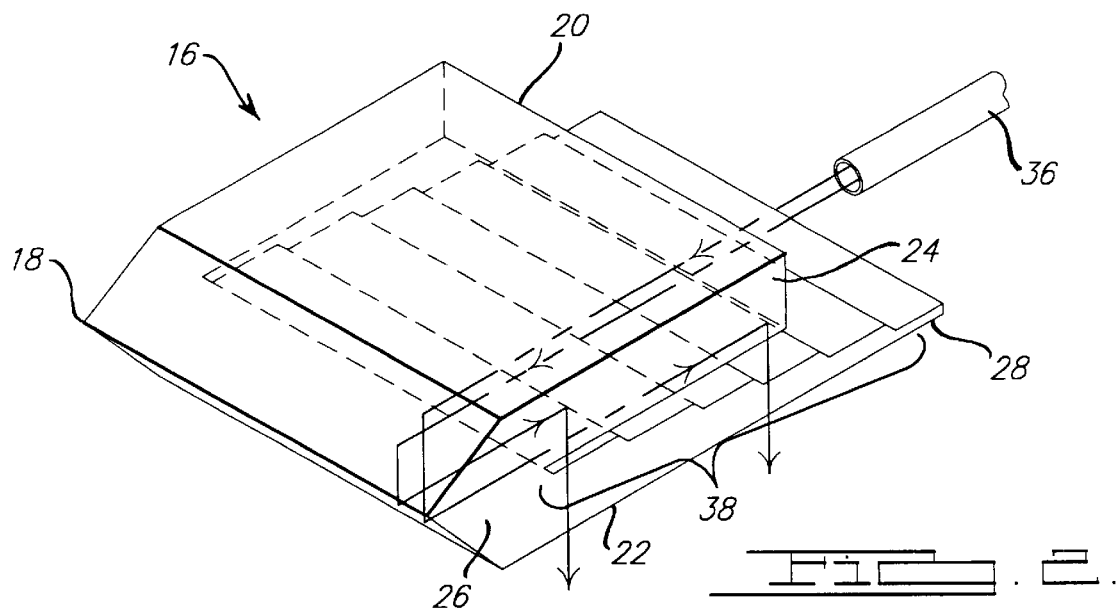
FIG. 2 is a perspective view of a thin sheet optical element tail lamp according to the present invention.
Figure 3:
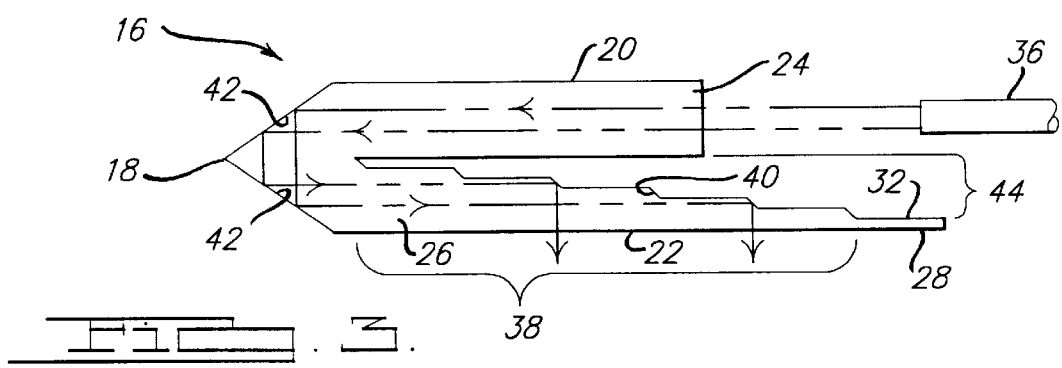
FIG. 3 is a side view of a thin sheet optical element according to the present invention.

As depicted in FIGS. 2 and 3, the thin sheet optical element tail lamp 16 has a manifold portion 20 which functions to expand incoming light and then redirect the light to a kicker portion 22. The kicker portion 22 functions to direct light through a front surface 28 and into a predetermined lighting area. Finally, a turning prism 18 is situated adjacent to and in optical communication with both the manifold portion 20 and the kicker portion 22. The turning prism 18 functions to totally internally reflect and redirect the light from the manifold portion 20 to the kicker portion 22.

Preferably disposed within the manifold portion 20 are a plurality of light expanding parabolic and reflective surfaces (not shown). These surfaces function to modify the angular and spatial distribution of the incoming light and to direct the light toward the kicker portion 22 via the turning prism 18. An example of one such manifold portion 20 is disclosed in U.S. application Ser. No. 08/780,034 entitled Laser Illuminated Lighting System, assigned to the assignee of the present invention, and herein incorporated by reference. The surfaces can be a variety of shapes and vary in number depending on the particular design objectives without departing from the scope of the present invention. The manifold portion 20 as herein disclosed has a manifold perimeter surface 24.

As shown in FIGS. 2 and 3, the kicker portion 22 of the thin sheet optical element tail lamp 16 has a series of steps 38 which are aligned to receive reflected and redirected light from the turning prism 18. The series of steps 38 direct the light through the front surface 28 to a predetermined illumination area. Each incremental step 38 has an angled surface 40 and a back surface 32. The back surface 32 is generally parallel to the front surface 28. The angled surfaces 40 of the steps 38 are angled relative to the light received from the turning prism 18 to reflect the light via total internal reflection (TIR) through the front surface 28. The angled surface 40 may be linear or curved depending on the spread angle of light desired. The angled surface 40 can be metalized if the light rays strike the plastic-air interface at an angle less than the critical angle which, is further described below. The kicker portion 22 has a kicker perimeter surface 26.

The turning prism 18 is a solid body through which light from the manifold portion 20 propagates. The turning prism 18 has preferably a continuous, generally triangular longitudinal cross-section. The triangular cross-section has generally planar, equilateral reflective surfaces 42, as shown in FIG. 3. The reflective surfaces 42 of the turning prism 18 function to redirect light received from the manifold portion 20 to the kicker portion 22. The reflective surfaces 42, although shown as planar, can also be either a convex or concave curve. Further, instead of a generally triangular longitudinal cross-section, the turning prism 18 could have a parabolic, hyperboloidal, or ellipsoidal cross-section, or any cross-section that facilitates the function of directing the light from the manifold portion 20 to the kicker portion 22. The principle of TIR is employed to accomplish the reflective function.

Total internal reflection of light occurs when an incident angle $\theta$ exceeds a critical angle $\theta_c$ given by the equation $\theta_c = \sin^{-1}(n_1, n_2,)$ wherein $n_1$ is the index of refraction of air and $n_2$ is the index of refraction of plastic. The plastic-air interface can be metalized if necessary to prevent the light rays from reflecting out of the plastic medium.

Utilization of a turning prism 18 is advantageous because it allows the manifold portion 20 to be positioned behind the kicker portion 22 thereby reducing the overall footprint of the thin sheet optical element 16, and more specifically, the footprint of the front surface 28 of the kicker portion 22.

The remote laser light source 12 is connected to the first end 34 of the fiber optic light guide 14 via a light coupler (not shown) such as those known in the art. The second end 36 of the fiber optic light guide 14 is situated adjacent to the manifold portion 20 of the thin sheet optical element tail lamp 16. The manifold portion 20 is generally parallel and adjacent to the back and front surfaces, 32 and 28 respectively, of the kicker portion. The manifold portion 20 of the thin sheet optical element tail lamp 16, as seen by a viewer of the tail lamp of an automotive vehicle 10, would be behind the kicker portion 22. Depending on the particular manufacturing requirements, a gap 44 of a predetermined distance may be provided between the manifold and kicker portions, 20 and 22 respectively. A turning prism 18 is positioned adjacent and in optical communication with predetermined portions of the manifold and kicker perimeter surfaces, 24 and 26 respectively. The manifold portion 20, kicker portion 22, and turning prism 18 preferably comprise a unitary thin sheet optical element 16, but may also be manufactured as individual components and then assembled.

In use, light is emitted from the remote laser light source 12, received by the fiber optic light guide 14 via a light coupler, transmitted through the fiber optic light guide 14 via TIR, and emitted at the second end 36 incident upon the manifold portion 20 of the thin sheet optical element tail lamp 16. The manifold portion 20 manipulates and expands the incoming laser light and transmits the light to the turning prism 18. The turning prism 18 totally internally reflects and redirects the light toward the kicker portion 22. Light is received by the kicker portion between the back and front surfaces, 32 and 28 respectively, and impacts upon the series of steps 38. The angled surfaces 40 of the series of steps 38 direct, via TIR, the light through the front surface 28 and into a predetermined lighting area.

Only one embodiment of the vehicle lighting system of the present invention has been described. Those skilled in the automotive lighting arts will appreciate that others may be possible without departing from the scope of the following claims.

We claim:

1. A tail lamp for use in an automotive vehicle, said tail lamp comprising:

a substantially planar manifold portion receives laser light from a laser light source, expands the laser light and transmits the laser light internally along a length of the manifold;

a substantially planar kicker portion is offset from, overlapping and substantially parallel to the manifold portion, the kicker portion has a plurality of stepped surfaces spaced from and angled with respect to the manifold portion, the kicker portion receives the laser light and redirects the laser light out of the kicker portion by reflection from the stepped surfaces; and a prism adjacent to and in optical communication with the manifold and kicker portions, wherein the manifold portion, kicker portion and prism form a single piece construction tail lamp and form a u-shaped cross section thereby, wherein a first leg of the u-shape cross-section is the manifold portion and a second leg of the u-shape is the kicker portion, whereby the prism receives the laser light from the manifold portion and internally reflects and redirects the laser light offset from and one hundred and eighty degrees to the direction of the light from when the light enters the manifold portion to the kicker portion.

* * * * *